UNITED STATES PATENT OFFICE

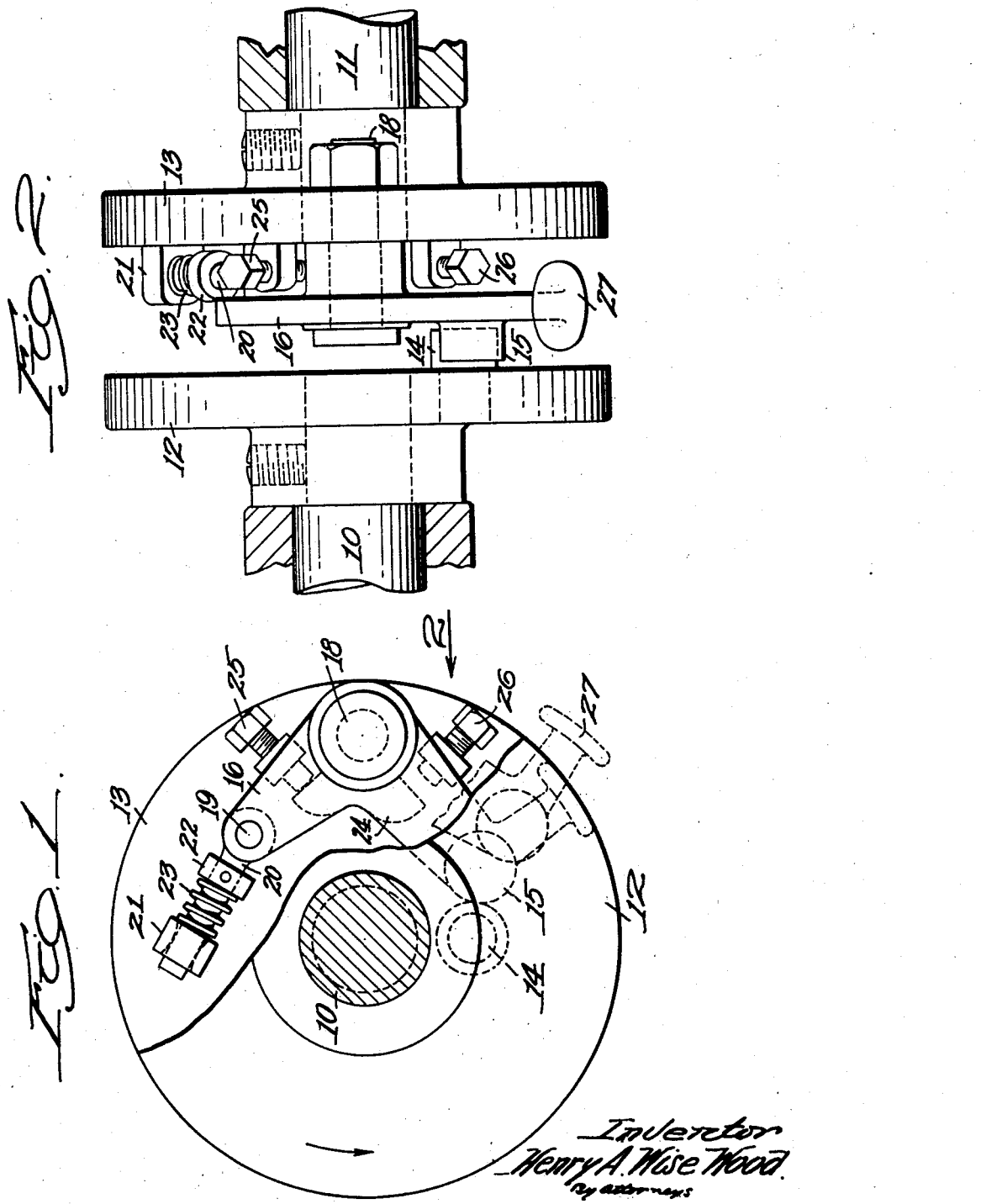

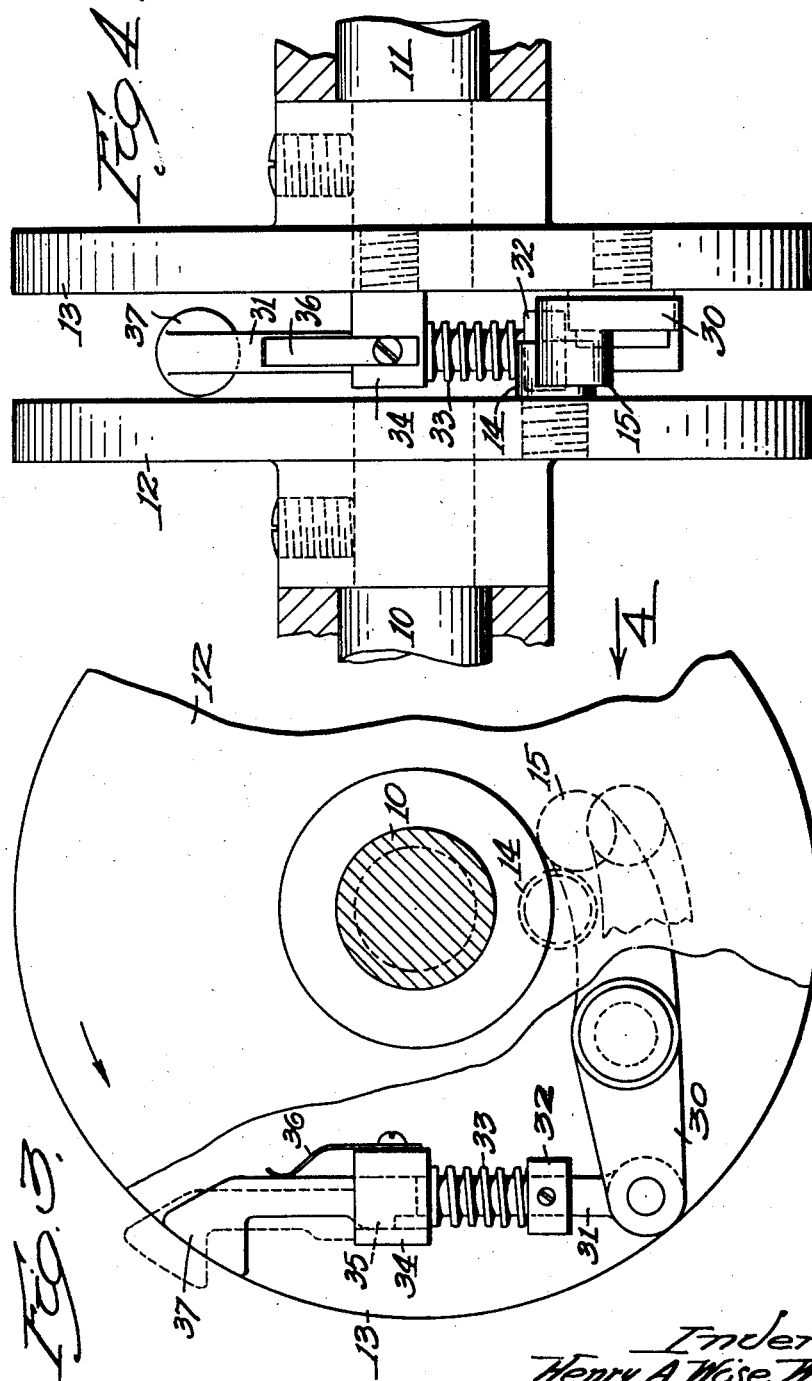

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

AUTOMATIC DISCONNECTING DEVICE

Application filed November 22, 1928. Serial No. 321,262.

This invention relates to a safety device for use in various kinds of machinery to disconnect the parts when they encounter so much resistance that otherwise breakage would occur.

The principal objects of the invention are to provide mechanical means for automatically disconnecting the drive without breaking any part of the device and to provide means by which it can be set back into operative position in a very easy and convenient manner and also to provide improvements in the details of construction.

Other objects and advantages of the invention will appear hereinafter.

Reference is to be had to the accompanying drawings in which

Fig. 1 is an end view of a shaft connection showing a preferred embodiment of this invention;

Fig. 2 is a side view of the same;

Fig. 3 is a view similar to Fig. 1 showing a modified construction; and

Fig. 4 is a side view of the same.

In machines where a great strain might cause breakage of parts, safety devices are used to prevent such breakage. In Figs. 1 and 2 I have shown a device for this purpose which, when any undue strain is applied, will disconnect the driving member from the driven member automatically, without fracturing a pin or any other part of the machine.

In these figures I have shown a driving shaft 10 and a driven shaft 11. Each of these shafts has a head as 12 and 13. On the head 12 is a fixed pin 14, which is the driving means that transmits power to the shaft 11. For this purpose it engages a projection 15 on a bell crank 16 pivoted on a stud 18 carried by the head 13. This bell crank is provided on its other arm, which is at right angles to the arm carrying the projection 15, with a pivot stud 19, on which is pivoted a rod 20. This rod passes loosely through a perforation in a projection 21 carried in fixed position on the head 13. On the rod is a nut 22 which can be adjusted to regulate the pressure of a spring 23 that surrounds the rod 20 and bears on the nut and on the projection 21.

It will be obvious that this spring pulls the rod 20 out away from the projection 21 as far as possible, that is, to bring the projection 15 into contact with the pin 14 and hold it there under spring pressure. As the direction of motion of the pin 14 against the projection 15 is almost circumferential, it has only a small component of force tending to swing the bell crank 16 and compress the spring 23.

However, when the strain becomes too great, this small component is increased to such an extent that the pin 14 will push the projection 15 outwardly to the position shown in dotted lines in Fig. 1 and thus swing the bell crank until the pin 19 is turned a considerable distance downwardly in that figure, when the toggle formed by the stud 18, pin 19 and projection 21 will be turned the other way and the bell crank will remain in its outer position. Thus the shaft 10 can continue to rotate and the head of the pin 14 will no longer strike the projection 15.

It will be noticed that there is a stop member 24 on the bell crank, one stop surface of which engages an adjustable stop screw 25 in the normal position shown in full lines in Fig. 1. The other side of this stop will engage the other adjustable stop screw 26 when the bell crank moves to the dotted line position, thus limiting the motion of the bell crank in both directions. The bell crank has a button 27 integrally mounted thereon, normally within the circumference of the head 13, and projected out beyond the same when in dotted line position.

To reset the device it is necessary only to force this button in until the stop 24 engages the screw 25 and then the toggle will hold it there.

This constitutes a simple means by which the shaft 11 is driven through the pin 14 and projection 15 under normal circumstances, capable of yielding under excess strain to disconnect the driving means and capable of being reset and holding itself in the resetting position and in fact, holding itself in either position in which it is placed. Yet it is not positive.

In the form shown in Figs. 3 and 4, the shafts and heads, driving pin 14 and projection 15 are the same as in the first two figures. The projection 15 is mounted on a lever 30, pivoted on the head 13 and having on the opposite side of the pivot, a pivoted rod 31 on which is a fixed or adjustable collar 32 against which a spring 33 bears. This spring bears at the other end on a projection 34 mounted on the head 13 and the rod 31 has a latch or projection 35. A spring 36 on the projection 34 bears on the rod 31 and when the projection 15 is pushed back to the dotted line position, compressing the spring 33, the spring 36 forces the rod over to the dotted line position and the latch 35 locks it there until a button 37 is pressed to release it and reset the device. This does not depend upon a toggle action but otherwise is similar to the form shown in the first two figures.

In all these forms I provide yielding means on one of the members for receiving or imparting a motion of rotation or any other motion that is to be transmitted. The parts are held in position for transmitting motion so that with the ordinary resistance furnished by the machinery, the parts will be driven at all times and yet they will yield when undue resistance is encountered and disconnect the parts. It is to be understood that this construction constitutes a part of the driving means and is not manipulated to start or stop the machine in any way except when undue resistance is encountered and then the stoppage of the machine is entirely automatic. In each case the machine is started up again by merely pressing a button and there are no parts that are likely to become broken in the operation of the stopping of the machine and nothing to be replaced each time.

Although I have illustrated and described only two forms of the invention I am aware of the fact that other modifications can be made therein by any person skilled in the art without departing from the scope of the invention as expressed in the claims. Therefore I do not wish to be limited in this respect but what I do claim is:—

1. In a device of the character described, the combination with a driving member having a fixed projection eccentrically arranged and a driven member, of a lever pivotally mounted on the driven member and having a part on one side of this pivot normally in the path of said fixed projection to transmit motion therefrom to the driven member, a rod pivotally connected with said lever on the other side of said pivot, a spring on the rod for holding the lever in driving position, said spring being capable of yielding to allow the lever to be forced out of driving position when undue resistance is encountered and means for holding the lever in inactive position until reset.

2. In a device of the character described, the combination with a driving member having a fixed projection eccentrically arranged and a driven member, of a lever pivotally mounted on the driven member and having a part normally in the path of said projection to transmit motion therefrom to the driven member, a rod pivotally connected with said lever, a spring on the rod for holding the lever in driving position, said spring being capable of yielding to allow the lever to be forced out of driving position when undue resistance is encountered, said rod and lever constituting a toggle arrangement adapted to be swung out of the straight line on one side when the parts are in driving position and to swing out of the straight line on the other side when they are in non-driving position.

3. In a device of the character described, the combination with a driving and a driven member, of a projection on one of said members, a lever pivotally mounted on the other member and having a part on one side of the pivot adapted to engage said projection, said lever forming a bell crank, a rod pivotally connected with the opposite end of the lever and having a spring thereon, a guide for the rod, a stop piece on the lever and two adjustable stopping screws, one to hold the lever against motion in one direction beyond the driving position and the other to hold it against motion beyond the position in which it will not engage the fixed projection.

In testimony whereof I have hereunto affixed my signature.

HENRY A. WISE WOOD.